(12) United States Patent
Shirai

(10) Patent No.: US 7,942,579 B2
(45) Date of Patent: May 17, 2011

(54) ROLLING GUIDE DEVICE AND METHOD OF MANUFACTURING THE SAME

(75) Inventor: Takeki Shirai, Tokyo (JP)

(73) Assignee: THK Co., Ltd., Tokyo (JP)

(*) Notice: Subject to any disclaimer, the term of this patent is extended or adjusted under 35 U.S.C. 154(b) by 472 days.

(21) Appl. No.: 11/994,225

(22) PCT Filed: Jun. 28, 2006

(86) PCT No.: PCT/JP2006/312905
§ 371 (c)(1),
(2), (4) Date: Sep. 19, 2008

(87) PCT Pub. No.: WO2007/004488
PCT Pub. Date: Jan. 11, 2007

(65) Prior Publication Data
US 2009/0123096 A1 May 14, 2009

(30) Foreign Application Priority Data
Jun. 30, 2005 (JP) ................................ 2005-191970

(51) Int. Cl.
*F16C 29/06* (2006.01)
*B21D 53/10* (2006.01)
(52) U.S. Cl. ..................................... 384/45; 29/898.03
(58) Field of Classification Search .............. 384/43–45; 29/898.03
See application file for complete search history.

(56) References Cited

U.S. PATENT DOCUMENTS

| | | | | |
|---|---|---|---|---|
| 2,628,135 | A | * | 2/1953 | Magee ............................. 384/43 |
| 3,552,806 | A | * | 1/1971 | Weasler et al. .................. 384/45 |
| 3,887,155 | A | * | 6/1975 | Bertalot ......................... 248/333 |

(Continued)

FOREIGN PATENT DOCUMENTS

JP 162128 U 10/1988
(Continued)

OTHER PUBLICATIONS

International Search Report of PCT/JP2006/312905, date of mailing Oct. 3, 2006.

*Primary Examiner* — Thomas R Hannon
(74) *Attorney, Agent, or Firm* — Westerman, Hattori, Daniels & Adrian, LLP

(57) ABSTRACT

Provided is a rolling guide device which can be produced easily and inexpensively by achieving a reduction in the number of parts constituting a slide member (2) and a reduction in machining worker-hours therefor. The rolling guide device includes: a raceway rail (1); and the slide member (2) assembled to the raceway rail (1) through an intermediation of the large number of balls (3), in which the slide member (2) is formed by bending a metal plate member (4) and has a lateral web (20) and a pair of flange parts (21) to be formed in a channel-like configuration, and in which each of the flange parts (21) has a track groove (30) in which the balls (3) circulate, the track groove (30) including a load straight-line groove (31) allowing the balls (3) to roll while bearing a load, a pair of ball deflection grooves (34) and releasing the balls (3) having rolled through the load straight-line groove (31) from the load while changing their direction, and a non-load straight-line groove (34) transferring the balls (3) from one ball deflection groove (34) to the other ball deflection groove (34).

8 Claims, 6 Drawing Sheets

U.S. PATENT DOCUMENTS

| | | | |
|---|---|---|---|
| 4,701,058 A * | 10/1987 | Mottate | 384/45 |
| 4,798,479 A | 1/1989 | Morita | |
| 4,815,862 A * | 3/1989 | Mugglestone et al. | 384/43 |
| 6,155,718 A | 12/2000 | Takamatsu et al. | |
| 6,240,796 B1 | 6/2001 | Yamada | |
| 7,600,918 B2 * | 10/2009 | Shirai et al. | 384/45 |
| 2008/0112656 A1 * | 5/2008 | Shirai et al. | 384/45 |

FOREIGN PATENT DOCUMENTS

| | | |
|---|---|---|
| JP | 98315 U | 6/1989 |
| JP | 4-53459 Y2 | 12/1992 |
| JP | 8312644 A | 11/1996 |
| JP | 10-9264 A | 1/1998 |
| JP | 1130234 A | 2/1999 |
| JP | 2003240090 A | 8/2003 |

* cited by examiner

ROLLING GUIDE DEVICE AND METHOD OF MANUFACTURING THE SAME

TECHNICAL FIELD

The present invention relates to a rolling guiding device and method of manufacturing the same in which a raceway rail and a slide member are assembled to each other through an intermediation of a large number of balls, enabling a mounted object fixed to the slide member to freely make a reciprocating movement along the raceway rail, and more particularly, to a rolling guiding device in which the slide member is equipped with an endless circulation path for the balls, enabling the slide member to move continuously along the raceway rail while causing the balls to make an endless circulation.

BACKGROUND ART

In a linear guiding portion of a work table of a machine tool or any one of various conveying devices, there is widely used a rolling guiding device in which a slide member with a movable member such as a table mounted thereon moves continuously along a raceway rail. In a rolling guiding device of this type, the slide member is assembled to the raceway rail through the intermediation of a large number of balls, and the balls roll along while bearing a load between the slide member and the raceway rail. As a result, it is possible for the movable member mounted on the slide member to make a smooth movement along the raceway rail while involving very little resistance. The slide member is equipped with an endless circulation path for the balls, and the balls are caused to circulate within this endless circulation path. As a result, it is possible for the slide member to move continuously along the raceway rail.

The raceway rail has a ball rolling groove extending in the longitudinal direction, and the slide member has a load rolling groove opposed to the ball rolling groove of the raceway rail, so a load rolling path for the balls is formed by the ball rolling groove on the raceway rail side and the load rolling groove on the slide member side. That is, the balls are held in contact with the ball rolling groove on the raceway rail side and the load rolling groove on the slide member side, and roll along while bearing a load exerted there between. Further, the slide member has a non-load rolling path which is parallel to the load rolling path, and both ends of this non-load rolling path are communication-connected with the load rolling path by a pair of direction changing paths formed in an arcuate configuration. The balls are released from the load at an end of the load rolling path, and are detached from the ball rolling groove of the raceway rail to enter one of the direction changing paths, from which the balls roll toward the non-load rolling path. The balls having rolled through the non-load rolling path are returned to the ball rolling groove of the raceway rail by way of the direction changing path on the opposite side before rolling through the load rolling path again while bearing the load. In this way, the slide member is equipped with an endless circulation path for the balls in which the load rolling path, one direction changing path, the non-load rolling path, and the other direction changing path are successively connected; while circulating through this endless circulation path, the balls are alternately placed in a loaded state and an unloaded state. As a result, the slide member can move continuously along the raceway rail without involving any limitations in terms of stroke.

Conventionally, the slide member includes a block body formed of a steel allowing quenching and a pair of synthetic resin end caps fixed to the front and rear end surfaces of the block body. In producing the block body, it is first roughly shaped through drawing, and then a mounting surface of a movable member, a tap hole for fastening a fixation bolt, and through-holes constituting the non-load rolling paths are formed by machining; further, it is necessary to perform grinding on the non-load rolling grooves. Further, the end caps are equipped with the direction changing paths scoop-up portions for detaching the balls from the rolling grooves of and the raceway rail, and are formed by injection molding of synthetic resin. Further, by accurately fixing the end caps to the front and rear end surfaces, the end portions of the load rolling paths and the end portions of the non-load rolling paths are connected by the direction changing paths, thereby completing a slide member equipped with endless ball circulation paths (JP 10-009264 A, Japanese Utility Model Examined Publication No. 04-53459, etc.).

Patent Document 1: JP 10-009264 A
Patent Document 2: Japanese Utility Model Examined Publication No. 04-53549

DISCLOSURE OF THE INVENTION

Problems to be Solved by the Invention

However, in this conventional rolling guide device, the block body constituting the slide member involves many machining worker-hours, so the reliability in machining precision is liable to be impaired. Further, in addition to the many machining worker-hours for the block body, it is necessary to provide the end caps for forming the endless circulation paths for the balls, resulting in a high production cost for the slide member attributable to the increase in machining worker-hours and the number of parts. In addition, in order to smoothen the circulation of the balls in the endless circulation paths, it is necessary to perform the mounting of the end caps to the block body with high precision, so a lot of time and effort is required for the assembly of the slide member.

Means for Solving the Problems

The present invention has been made in view of the above-mentioned problems. It is therefore an object of the present invention to provide a rolling guide device and a method of manufacturing the same which allow easy and inexpensive production by achieving a reduction in the number of parts constituting the slide member and a reduction in the machining worker-hours therefor and which help to achieve an improvement in terms of reliability in machining precision.

In order to achieve the above-mentioned object, a rolling guide device according to the present invention includes: a raceway rail having a longitudinally extending rolling groove for a large number of balls; and a slide member assembled to the raceway rail through an intermediation of the large number of balls, in which the slide member is formed by bending a metal plate member and has a lateral web and a pair of flange parts provided upright on the lateral web to be formed in a channel-like configuration, and in which each of the flange parts has a track groove in which the balls circulate in an endless manner, the track groove including a load straight-line groove allowing the balls to roll while bearing a load between itself and a rolling groove of the raceway rail, a pair of ball deflection grooves respectively provided at both ends of the load straight-line groove and releasing the balls having rolled through the load straight-line groove from the load and to change their rolling direction to detach the balls from the rolling groove of the raceway rail, and a non-load straight-line groove transferring the balls under no load from one ball deflection groove to the other ball deflection groove.

In this rolling guide device, the balls are accommodated in the track grooves formed in the flange parts of the slide member, and perform endless circulation in the track grooves. The track grooves can be formed in the metal plate member at a stage prior to the formation of the channel-like slide member through bending of the metal plate member. That is, a pair of track grooves in which balls are to perform endless circulation are formed at a predetermined interval in a flat metal plate member, and the portions where the track grooves are formed are bent and raised to thereby form the flange parts, thus forming the channel-like slide member. In forming the track grooves in the flat metal plate member, it is possible, for example, to continuously form endless track grooves by cutting using an end mill or the like, or to form the same by pressing using a die. In either case, the track grooves can be easily formed in the flat metal plate member; further, by performing bending on this metal plate member, it is possible to easily form a channel-like slide member having a pair of flange parts equipped with track grooves. Further, there is no need to perform any further machining or part mounting on the slide member thus formed, thereby making it possible to manufacture the slide member easily and inexpensively. Further, since very few worker-hours are required, it is possible to achieve an improvement in terms of reliability in machining precision.

DESCRIPTION OF REFERENCE NUMERALS

1 . . . raceway rail, 2 . . . slide member, 3 . . . ball, 10 . . . rolling groove, 20 . . . lateral web, 21 . . . flange part, 30 . . . track groove, 31 . . . load straight-line groove, 33 . . . non-load straight-line groove, 34 . . . ball deflection groove

BEST MODE FOR CARRYING OUT THE INVENTION

In the following, the rolling guide device of the present invention will be described in detail with reference to the accompanying drawings.

Figure 1:
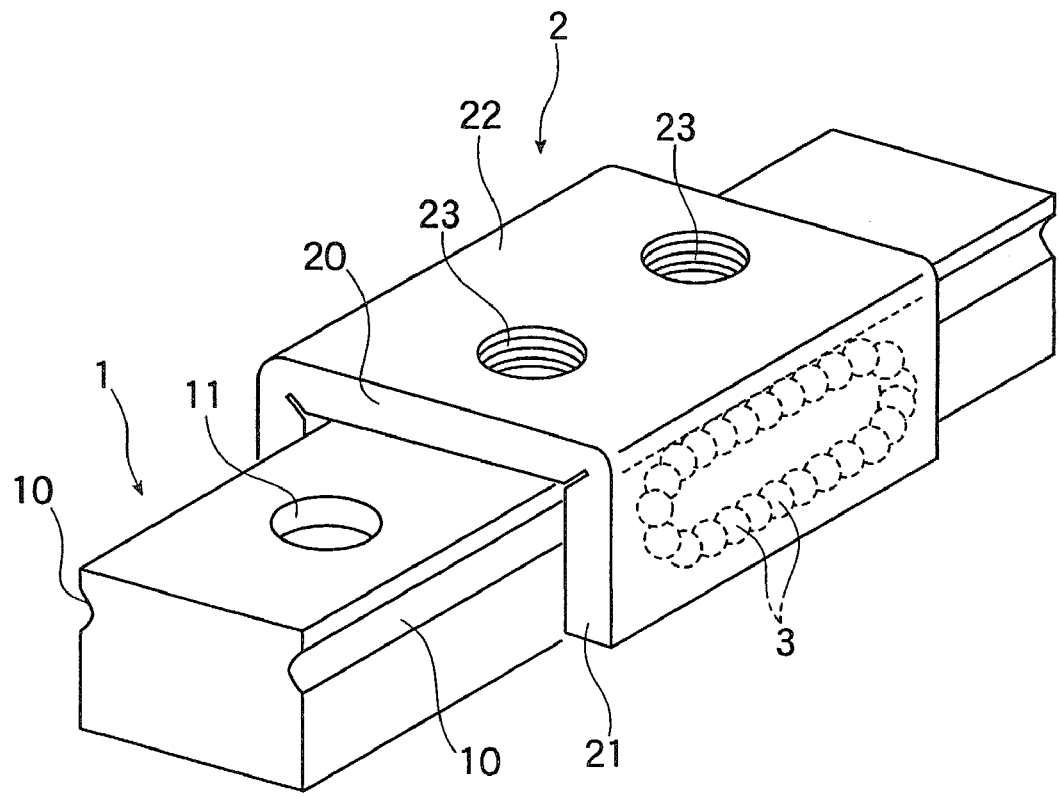
FIG. 1 is a perspective view of a rolling guide device according to a first embodiment of the present invention.
Figure 2:
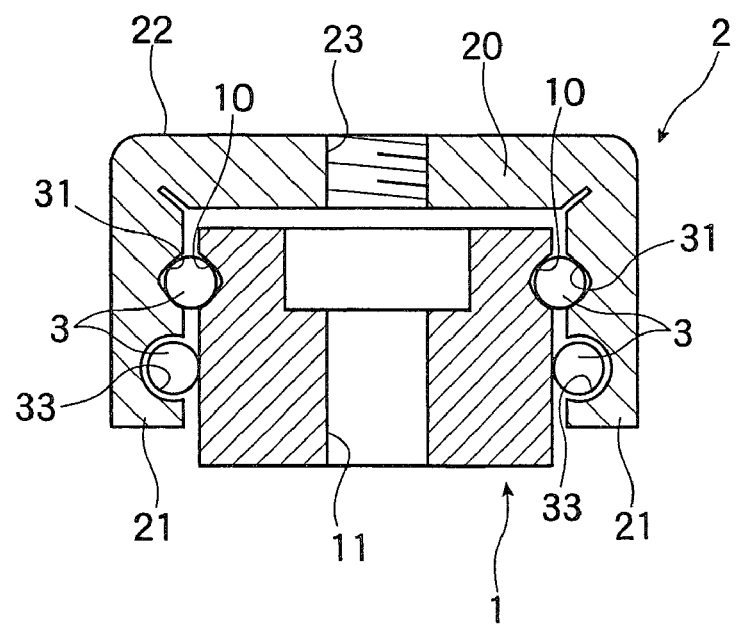
FIG. 2 is a front sectional view of the rolling guide device shown in FIG. 1.

FIGS. 1 and 2 show a rolling guide device according to the first embodiment of the present invention. The rolling guide device of the first embodiment includes an elongated raceway rail 1 formed in a substantially rectangular sectional configuration, and a slide member 2 formed in a channel-like configuration and assembled to the raceway rail 1 through the intermediation of a large number of balls 3, with the slide member 2 reciprocating freely on the raceway rail 1 while astride the raceway rail 1.

Each of the two sides of the raceway rail 1 has a longitudinally extending rolling groove 10 for the balls 3. Each rolling groove 10 has two rolling surfaces on which the balls 3 roll and which are at angle of 90° with respect to each other, with its section formed in a configuration of so-called Gothic arch. Thus, the balls 3 are in contact with the rolling groove at two points, with the contact directions being inclined by 45° with respect to the bottom surface of the raceway rail 1. Further, the raceway rail 1 has a plurality of bolt mounting holes 11 formed at predetermined longitudinal intervals, and the raceway rail 1 can be mounted to a stationary portion such as a bed, a column or the like of various machines by utilizing the bolt mounting holes 11.

The slide member 2 has a lateral web 20 and a pair of flange parts 21, 21 orthogonal to the lateral web 20, and is formed in a channel-like configuration so as to be astride the raceway rail through the intermediation of a slight gap as shown in FIG. 2. That is, the raceway rail 1 is situated between the pair of flange parts 21, 21 of the slide member 2. The lateral web 20 constitutes a mounting surface 22 for a movable member such as a table, with the lateral web 20 having tap holes 23 to be threadedly engaged with mounting screws.

Figure 3:
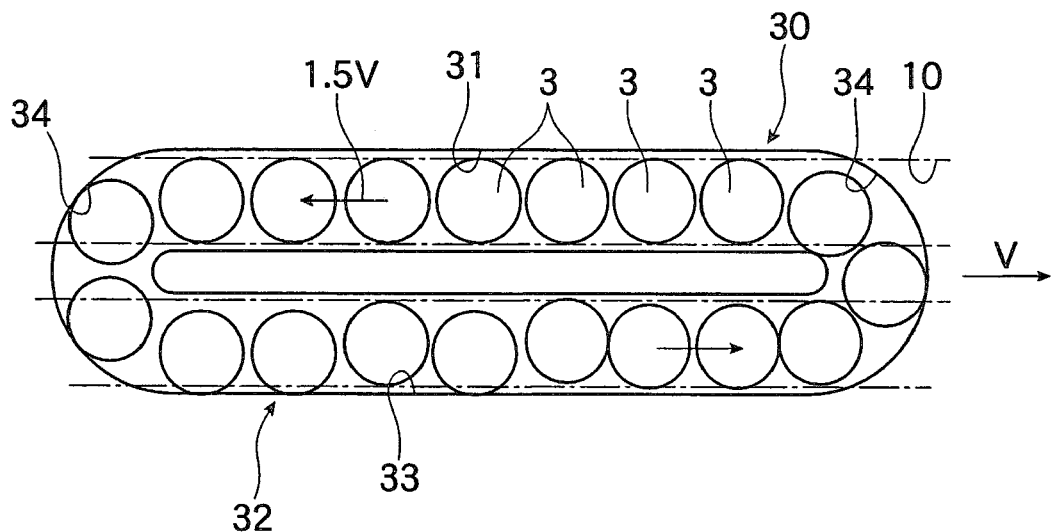
FIG. 3 is an enlarged view of a track groove of a slide member of the rolling guide device show in FIG. 1.

As shown in FIG. 1, a track groove 30 accommodating a large number of balls 3 is formed in each of the inner surfaces of the flange members 21 of the slide member 2 opposed to the side surface of the raceway rail 1 through the intermediation of slight gaps. As shown in FIG. 3, each track groove 30 includes a load straight-line groove 31 opposed to the rolling groove 10 of the raceway rail 1, a non-load straight-line groove 33 formed to extend parallel to the load straight-line groove 31 and opposed to the side surface of the raceway groove 1, and ball deflection grooves 34 allowing passage of the balls 3 between the load straight-line groove 31 and the non-load straight-line groove 33. The balls 3 roll along while bearing a load between the rolling grooves 10 of the raceway rail 1 and the load straight-line grooves 31 of the slide member 2, whereby the slide member 2 can freely reciprocate along the raceway rail 1. That is, load rolling paths for the balls 3 are formed by the rolling grooves 10 of the raceway rail 1 and the non-load straight-line grooves 31 of the slide member 2 respectively opposed to each other.

Figure 4:
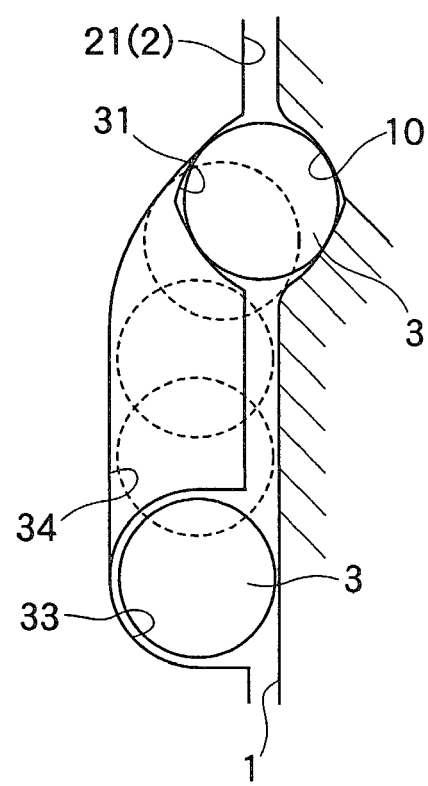
FIG. 4 is an enlarged sectional view illustrating how balls move in a ball deflection groove of the track groove.

As shown in FIG. 4, the rolling groove 10 of the raceway rail 1 and the load straight-line groove 31 in the track groove 30 opposed thereto are formed in a sectional configuration of Gothic arch, and each ball 3 is in contact with the load straight-line groove 31 at two points. The contact direction of the ball 3 and the rolling groove 10 or the load straight-line groove 31 is inclined vertically by 45° with respect to the direction of the normal of the inner side surface of the flange part 21 (lateral direction in FIG. 4), and the balls 3 can bear all the load exerted in a direction orthogonal to the moving direction of the slide member between the raceway rail 1 and the slide member 2.

Then on-load straight-line groove 33 constituting apart of the track groove 30 has a width slightly larger than the diameter of the balls 3, and is opposed to the side surface of the raceway rail 1, thereby forming a non-load rolling path for the balls 3. The depth of the non-load straight-line groove 33 is substantially the same as or slightly smaller than the diameter of the balls 3; since a gap exists between the flange part 21 of the slide member 2 and the side surface of the raceway rail 1, the balls 3 are accommodated in the non-load rolling groove 33 while in a non-load state, that is, in a state in which they can freely rotate.

The ball deflection grooves 34 have substantially U-shaped raceways connecting the load straight-line grooves 31 and the non-load straight-line grooves 33; the U-shaped raceways release the balls 3, having rolled through the load straight-line grooves 31 while bearing a load, from the load, and gradually change the direction in which the balls 3 roll, sending them into the non-load straight-line grooves 33 after direction change by 180 degrees. The ball deflection grooves 34 are formed so as to be shallowest at the positions where they are connected to the load straight-line grooves 31 and deepest at the positions where they are connected to the non-load straight-line grooves 33. Due to the gradual deepening of the ball deflection grooves 34, the balls 3 having rolled through the load straight-line grooves 31 are released from the load upon entering the ball deflection grooves 34, advance through the ball deflection grooves 34 in a non-load state toward the non-load straight-line grooves 33, and directly enter the non-load straight-line grooves 33 while maintaining the non-load state.

When the slide member 2 is moved along the raceway rail 1, the balls 3 held between the rolling grooves 10 of the raceway rail 1 and the load straight-line grooves 31 of the slide member 2, that is, the balls 3 bearing the load within the load rolling paths move within the load straight-line grooves 31 at a speed of 0.5 V, which is half a speed V at which the slide member 2 moves relative to the raceway rail 1. Since, as stated above, the ball deflection grooves 34 become gradually deeper, the balls 3 rolling through the load straight-line grooves 31 are gradually released from the load upon reaching the ball deflection grooves 34. The balls 3 released from the load advance as they are through the rolling grooves 10 of the raceway rail 1 while pushed by the succeeding balls 3; since the ball deflection grooves 34 interrupt the rolling of the balls 10 in the rolling grooves 10 and forcibly change the advancing direction of the balls 3, the balls 3 are moved sidewise within the rolling grooves 10 by the ball deflection grooves 34, and climb up the rolling grooves 10 to be gradually raised to the side surface of the raceway rail 1. As a result, the balls 3 completely leave the rolling grooves 10 of the raceway rail 1, and are completely accommodated in the ball deflection grooves 34 of the slide member 2.

The ball deflection grooves 34 have substantially U-shaped raceways, so the balls 3 accommodated in the ball deflection grooves 34 reverse their rolling direction, and enter a non-load rolling path formed by the side surface of the raceway rail 1 and the non-load straight-line groove 33 of the slide member 2 opposed to each other. The balls 3 having advanced through the non-load rolling path enter the ball deflection groove 34 on the opposite side, and reverse the rolling direction again before entering a load rolling path formed by the rolling groove 10 of the raceway rail 1 and the load straight-line groove 31 of the slide member 2. In this process, the balls 3 climb down the rolling groove 10 of the raceway rail 1 sidewise, and enter the non-load rolling path; as the depth of the ball deflection groove 34 is gradually reduced, transition is effected from the non-load state to the loaded state.

In this way, the balls 3 circulate through the track grooves 30 of the slide member 2, and with this circulation, the slide member 2 can move incessantly and continuously along the raceway rail 1.

In the rolling guide device of this embodiment, the above-described track grooves 30 are formed in the flange parts of the slide member opposed to the side surfaces of the raceway rail 1, and the endless circulation paths for the balls 3 are formed by the track grooves 30, so the structure of the slide member 2 is very simple. Further, entering and detachment of the balls 3 with respect to the rolling grooves 10 of the raceway rail 1 is effected solely by the ball deflection grooves 34 formed in the track grooves 30, and no other member is required. As a result, also in this respect, the structure of the slide member 2 is very simple.

Next, a method of manufacturing the slide member 2 will be described.

The slide member 2 is formed by bending a metal plate member 4 such as a flat steel plate into a channel-like shape; at a stage prior to the bending, the track grooves 30 and the tap holes 23 are formed by machining.

Figure 5:
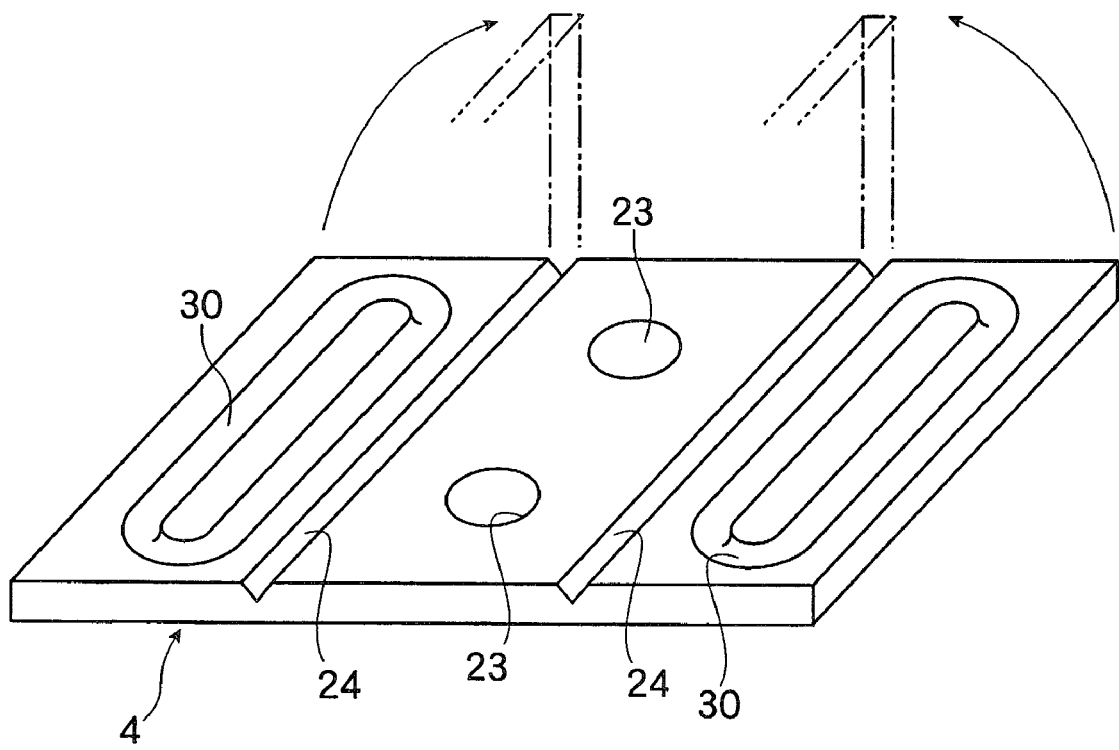
FIG. 5 is a perspective view illustrating how the slide member is manufactured.

First, the flat metal plate member 4 is divided into regions respectively corresponding to the lateral web 20 and the pair of flange parts 21, 21. As shown in FIG. 5, the track grooves 30 are formed in the surfaces of the regions corresponding to the flange parts 21. The track grooves 30 can be easily formed by milling using an end mill or the like; for example, the load straight-line grooves 31 can be formed by using a form milling cutter in conformity with the sectional configuration of Gothic arch. The ball deflection grooves 34 and the non-load straight-line grooves 33 can be formed as grooves of a substantially semi-circular sectional configuration by using a ball end mill. Further, the depths of the load straight-line grooves 31 and the non-load straight-line grooves 33 can be adjusted with high precision through numerical control of the machine tool; also regarding the ball deflection grooves 34 between the load straight-line grooves 31 and the non-load straight-line grooves 33, it is possible to impart to them a sufficient depth and configuration for allowing detachment of the balls 3 from the rolling grooves 10 of the raceway rail 1.

Further, the non-load straight-line grooves 33 and the ball deflection grooves 34 may be formed in the same sectional configuration of Gothic arch as the load straight-line grooves 31; in this case, by adjusting the depths of the grooves 33, 34, it is possible to place the balls 3 in a non-load state. In this way, when the load straight-line grooves 31, the non-load straight-line grooves 33, and the ball deflection grooves 34 are formed in the same sectional configuration, it is possible to form the track grooves 30 by a single process using solely a single form milling cutter, thus further facilitating the formation of the track grooves 30.

When the load capacity of the slide member 2 is small, and a thin plate is used as the metal plate member 4 for forming the slide member 2, the track grooves 30 can be formed by plastic processing such as pressing without performing any cutting. In this case, the slide member 2 can be formed less expensively and in an amount greater than when the track grooves 30 are formed by cutting.

When the track grooves 30 are formed in the metal plate member 4, the holes 23 are formed by machining in the region of the metal plate member 4 corresponding to the lateral web 20; further, raising reference grooves 24 of a substantially V-shaped sectional configuration are formed at boundaries between the lateral web 20 and the flange parts 21. By forming the raising reference grooves 24 in advance, it is possible to perform bending of the flange parts 21 with respect to the lateral web 20 with high precision. When the metal plate member 4 is thin, and the bending of the flange parts 21 can be performed with sufficient accuracy, there is no need to form the raising reference grooves 24.

Next, in order to enhance the wear resistance of the track grooves 30 with respect to the rolling of the balls 3, surface hardening processing is performed on the regions of the metal plate member 4 corresponding to the flange parts 21. As the surface hardening processing, it is possible to perform high-frequency quenching, carburizing and quenching, and nitriding or the like. When warp is generated in the metal plate member 4 by the quenching processing, it is possible to perform finish processing on the track grooves 30 after the quenching processing by using a cemented carbide end mill or the like.

Further, when the surface hardening processing on the track grooves 30 is thus completed, the end portions of the metal plate member 4 in which the track grooves 30 have been formed are raised as indicated by alternate long and short dashed lines in FIG. 5, and the pair of flange parts 21, 21 are raised perpendicularly with respect to the lateral web 20, whereby the slide member 2 of a substantially channel-like sectional configuration is completed.

In this slide member 2 thus formed, a pair of track grooves 30 are formed at predetermined positions on the metal plate member 4, and the pair of flange parts 21 are just raised so as to cause to track grooves 30 to oppose each other. Further, also regarding the track grooves 30, it is possible to perform processing on the flat metal plate member 4, so the slide member can be produced very easily and inexpensively. Further, no other part than the metal plate member 4 is required to provide the slide member 2 with endless circulation paths for the balls 3, and there is no need to produce or assemble some other component. Therefore, the processing worker-hours involved are markedly few, and it is possible to achieve an improvement in reliability with respect to machining precision.

Figure 6:
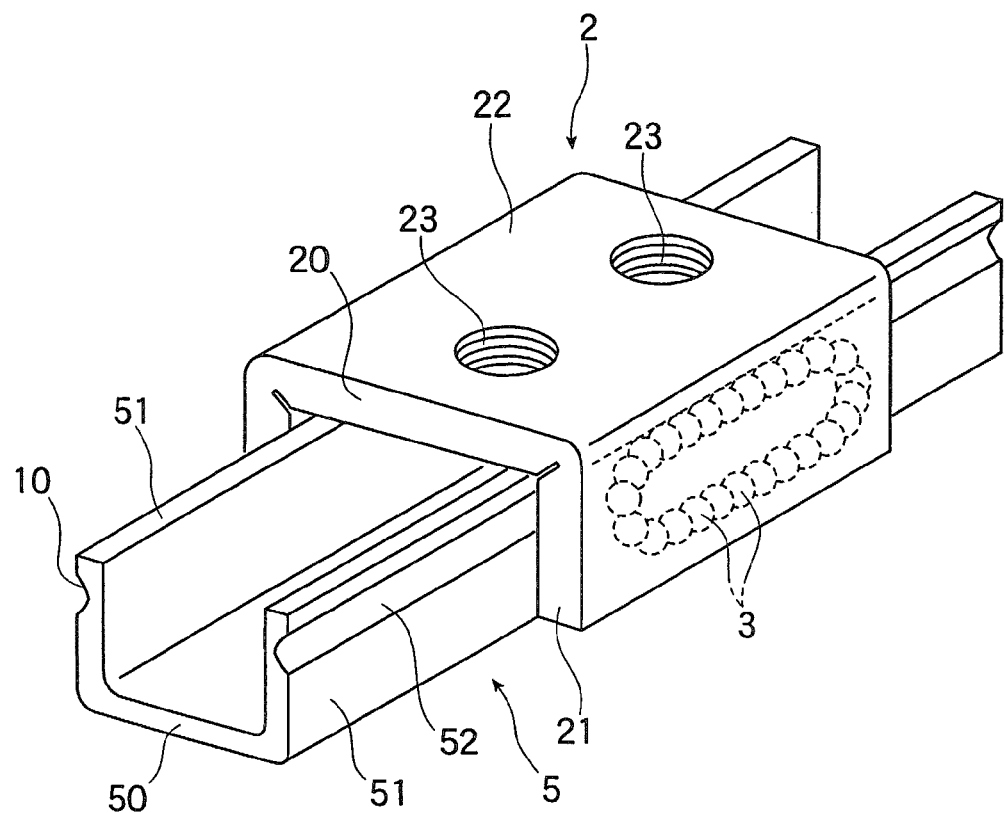
FIG. 6 is a perspective view of a rolling guide device according to a second embodiment of the present invention.
Figure 7:
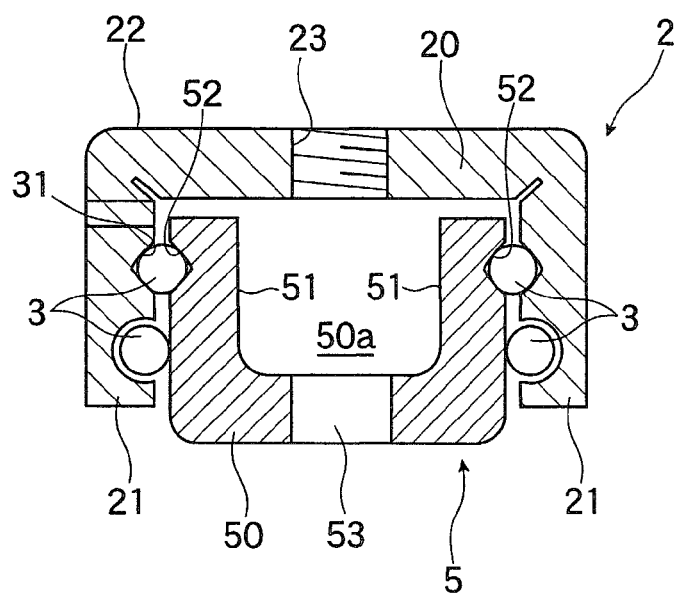
FIG. 7 is a front sectional view of the rolling guide device shown in FIG. 6.

FIGS. 6 and 7 show a rolling guide device according to the second embodiment of the present invention.

In the first embodiment shown in FIGS. 1 and 2, a solid steel member of a substantially rectangular sectional configuration is used as the raceway rail 1. In contrast, in the second embodiment, a raceway rail 5 is formed by bending a metal plate member like the slide member 2. The raceway rail 5 has a base portion 50 fastened by a screw to a machine portion such as a bed or a column, and a pair of sidewall portions 51, 51 provided upright on the base portion 50. The raceway rail 5 is formed in a substantially channel-like sectional configuration with an accommodating groove 50a between the pair of side wall portions 51, and rolling grooves 52 for the balls 3 are formed in the outer side surfaces of the side wall portions 51. Further, the base portion 50 has a mounting hole 53 through which a fixing screw is to be passed.

The raceway rail 5 can be easily formed by pressing or roll forming; in particular, in roll forming, the operations of forming the rolling grooves 52 for the balls 3 to raising the side wall portions 51 can be collectively performed as a series of processes in the same production line. Thus, the raceway rail 5 can be produced inexpensively and in a large amount; by combining the slide member 2 of the first embodiment with the raceway rail 5, it is possible to provide a rolling guide device of a very low cost.

The slide member 2 shown in FIGS. 6 and 7 are the same as the slide member 2 of the first embodiment shown in FIGS. 1 and 2, so the same reference numerals are used therefor, and a detailed description thereof will be omitted.

Figure 8:
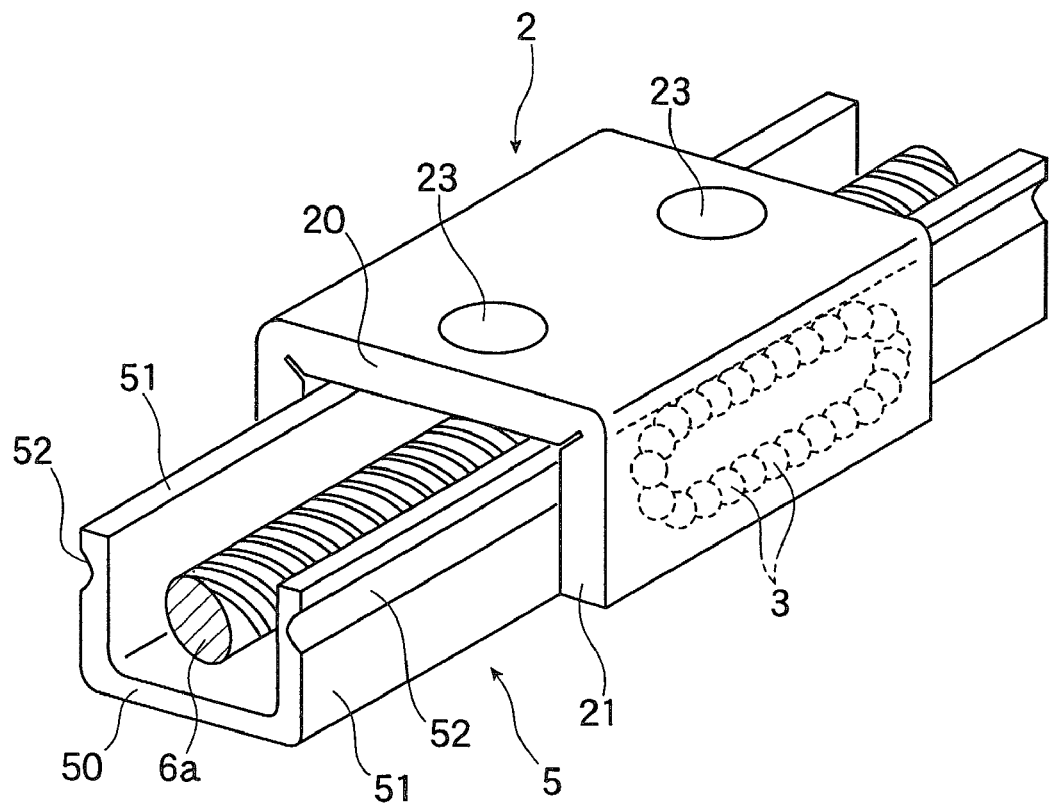
FIG. 8 is a perspective view of a rolling guide device according to a third embodiment of the present invention.
Figure 9:
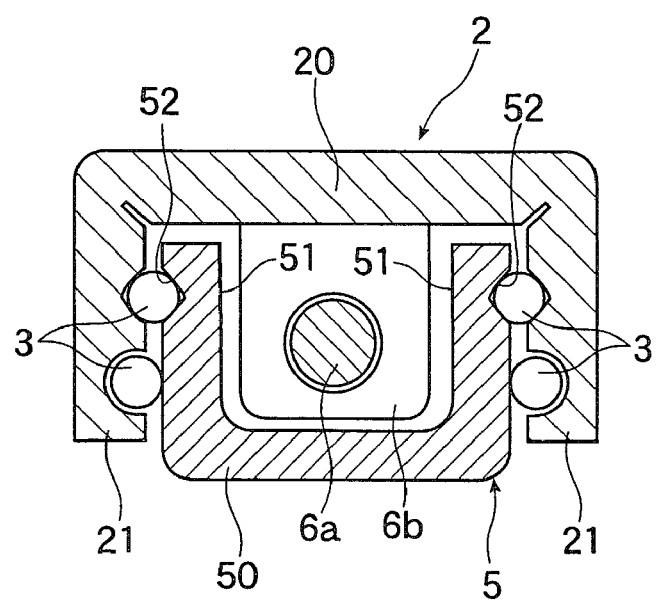
FIG. 9 is a front sectional view of the rolling guide device shown in FIG. 8.

Next, FIGS. 8 and 9 show a rolling guide device according to the third embodiment of the present invention.

In the third embodiment, the rolling guide device shown in FIGS. 6 and 7 is provided with a screw shaft 6a for propelling the slide member 2, thus forming a linear actuator reciprocating the slide member 2 in response to the rotation of a motor.

Between the pair of flange parts of the raceway rail 5 formed in a channel-like configuration, there is arranged the screw shaft 6a extending in the longitudinal direction of the raceway rail, and the screw shaft 6a is rotatably supported by a bearing (not shown) so as to be rotatable with respect to the raceway rail 1. A nut member 6b to be threadedly engaged with the screw shaft 6a is fixed to the lower surface of the lateral web 20 of the slide member 2, that is, the surface on the side opposite to the mounting surface 22 for a movable member. Thus, when the screw shaft 6a is rotated by a motor, it is possible to cause the slide member 2 to be retractable along the raceway rail 5 according to the rotating amount of the screw shaft 6. From the viewpoint of reducing the drive torque of the motor and achieving downsizing of the motor, the combination of the screw shaft and the nut member adopted is preferably one in which the nut member 6b is threadedly engaged with the screw shaft 6a through the intermediation of a large number of balls circulating in an endless manner. However, the combination of the screw shaft and the nut member may also be one of the types in which the screw shaft 6a and the nut member 6b are simply in sliding contact with each other.

In the linear actuator shown in FIGS. 8 and 9, the screw shaft 6a is situated within the accommodating groove 50a of the channel-like raceway rail 5, and the nut member 6b threadedly engaged with the screw shaft 6a is also situated within the accommodating groove 50a of the raceway rail 5 while fixed to the lateral web 20 of the slide member 2, so the screw shaft and the nut member are not allowed to stick out of the raceway rail and the slide member, thus making it possible to form a linear actuator of a very small size.

Figure 10:
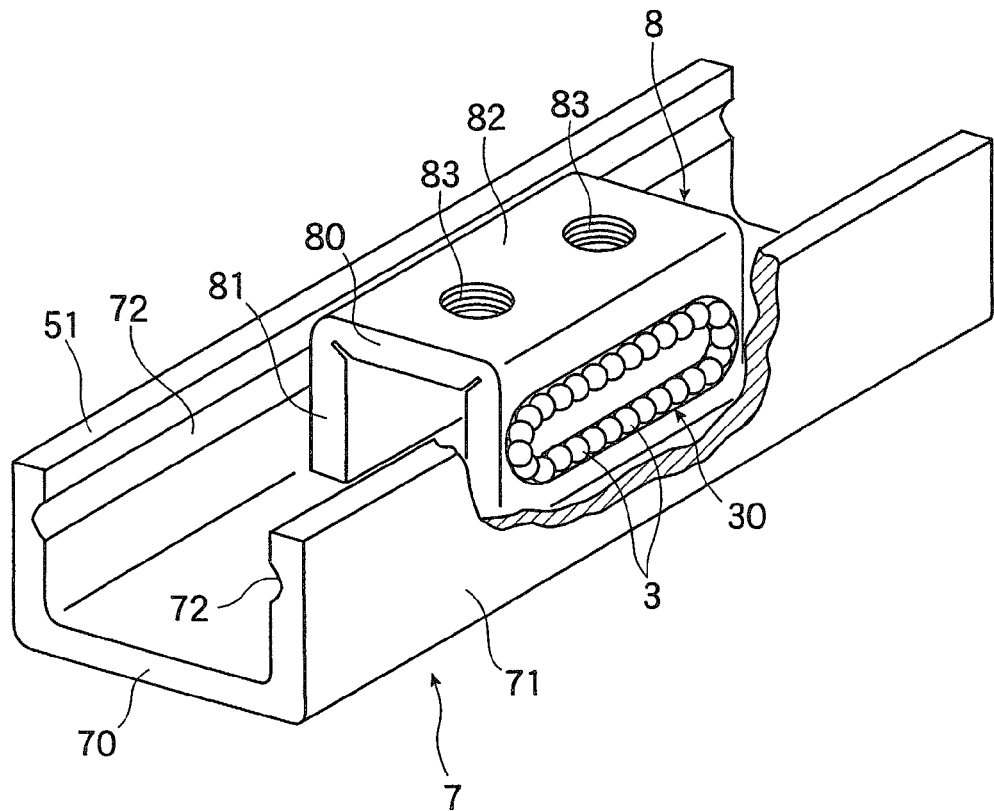
FIG. 10 is a perspective view of a rolling guide device according to a fourth embodiment of the present invention.
Figure 11:
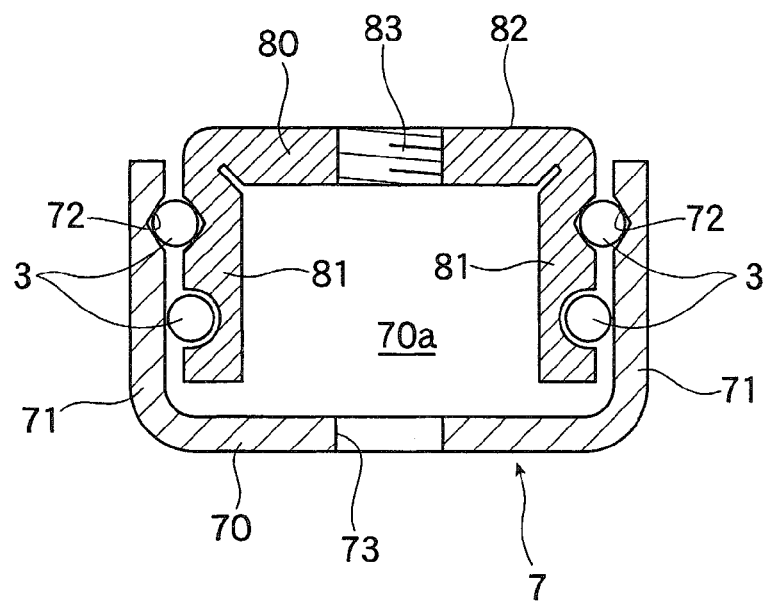
FIG. 11 is a front sectional view of the rolling guide device shown in FIG. 10.

FIGS. 10 and 11 show a rolling guide device according to the fourth embodiment of the present invention.

In this embodiment, a raceway rail 7 has a base portion 70 to be fastened by screws to a machine portion such as a bed or a column and a pair of side wall portions 71, 71 provided upright on the base portion 70. The raceway rail 7 has an accommodating groove 70a between the pair of side wall portions 71 and is formed in a substantially channel-like sectional configuration, with rolling grooves 72 for the balls 3 being formed in the inner surfaces of the side wall portions 71. Further, the base portion 70 has a mounting hole 73 through which a fixing screw is to be passed.

A slide member 8 has a lateral web 80 and a pair of flange parts 81, 81 orthogonal to the lateral web 80 and is formed in a channel-like configuration and loosely fitted in the accommodating groove of the raceway rail as shown in FIG. 11. That is, the slide member 8 is situated between the pair of side wall portions 71, 71 of the raceway rail 7, and the outer side surfaces of the flange parts 81 of the slide member 8 and the inner side surfaces of the side wall portions 71 of the raceway rail 7 are opposed to each other through the intermediation of slight gaps. The upper surface of the lateral web 80 protrudes upwardly from the accommodating groove 70a of the raceway rail 7 and constitutes a mounting surface 82 for a movable member such as a table. The lateral web 80 has tap holes 83 to be threadedly engaged with mounting screws.

As shown in FIG. 10, the track grooves 30 accommodating a large number of balls 3 are formed in the outer side surfaces of the flange parts 81 of the slide member 8 opposed to the inner side surfaces of the side wall portions 71 of the raceway rail 7 through the intermediation of slight gaps. Each of the track grooves is completely the same as that described with reference to FIG. 3, and includes the load straight-line groove 31 opposed to the rolling groove 72 of the raceway rail 7 and a circulation groove 32 for causing the balls to circulate from one end of the load straight-line groove 31 to the other end thereof. The balls 3 roll while bearing load between the rolling grooves 72 of the raceway rail 7 and the load straight-line grooves 31 of the slide member 8, and further, circulate in an endless manner through the circulation grooves, whereby the slide member 8 freely reciprocates within the accommodating groove 70a along the raceway rail 7.

Also in the rolling guide device shown in FIGS. 10 and 11, the slide member 8 is formed by performing bending on a flat metal plate member. That is, a pair of track grooves 30, 30 are formed at a predetermined interval in the metal plate member, and bending is performed on the metal plate member such that the track grooves 30 are situated in the outer side surfaces of the flange parts 81, whereby the slide member 8 is completed. The raceway rail is also formed of a flat metal plate member by roll forming or the like. Thus, like the rolling guide device of the second embodiment described above, the rolling guide device of the fourth embodiment can also be formed very easily and inexpensively.

The invention claimed is:

1. A rolling guide device, comprising:
   a raceway rail having a longitudinally extending rolling groove for a large number of balls; and
   a slide member assembled to the raceway rail through an intermediation of the large number of balls,
   wherein the slide member is formed by bending a metal plate member and has a lateral web and a pair of flange parts provided upright on the lateral web to be formed in a channel-like configuration,
   wherein each of the flange parts includes
      a track groove in which the balls circulate in an endless manner, the track groove comprising a load straight-line groove allowing the balls to roll while bearing a load between itself and a rolling groove of the raceway rail,
      a pair of ball deflection grooves respectively provided at both ends of the load straight-line groove and releasing the balls having rolled through the load straight-line groove from the load and to change their rolling direction to detach the balls from the rolling groove of the raceway rail, and
      a non-load straight-line groove transferring the balls under no load from one ball deflection groove to the other ball deflection groove,
   wherein the ball deflection grooves and the non-load straight-line groove of the track groove are opposed to the raceway rail so that the balls are retained in the ball deflection grooves and the non-load straight-line groove, and
   wherein the ball deflection grooves are formed so as to be shallowest at the positions where the ball deflection grooves are connected to the load straight-line grooves and deepest at the positions where the ball deflection grooves are connected to the non-load straight-line grooves.

2. The rolling guide device according to claim 1, wherein the raceway rail is situated between the pair of flange parts of the slide member.

3. The rolling guide device according to claim 2, wherein the raceway rail is formed by bending a metal plate member and has a base portion and a pair of side wall portions provided upright on the base portion to form a channel-like configuration.

4. The rolling guide device according to claim 3,
   wherein a screw shaft extending in a longitudinal direction of the raceway rail is rotatably provided between the pair of side wall portions of the raceway rail formed in a channel-like configuration, and
   wherein a nut member threadedly engaged with the screw shaft is fixed to the lateral web of the slide member.

5. The rolling guide device according to claim 1,
   wherein the raceway rail has an accommodating groove continuous in a longitudinal direction and is formed in a channel-like configuration, and
   wherein the slide member is loosely fitted in the accommodating groove of the raceway rail.

6. A method of manufacturing the rolling guide device of claim 1, comprising:
   forming the pair of track grooves in the slide member in which the balls are to circulate in an endless manner at a predetermined interval in one surface of the metal plate member, the metal plate member being in a flat state; and
   bending and raising the portions of the metal plate member where the track grooves are formed, to thereby form the flange parts.

7. The method of manufacturing according to claim 6, wherein the track grooves are formed by performing pressing on the metal plate member.

8. The method of manufacturing according to claim 6, further comprising:
   prior to bending and raising the flange parts of the slide member, forming raising reference grooves at boundaries between the lateral web and the flange parts.

* * * * *